(12) United States Patent
Lee

(10) Patent No.: US 12,315,135 B2
(45) Date of Patent: May 27, 2025

(54) TRANSMISSION IMAGE-BASED NON-DESTRUCTIVE INSPECTING METHOD, METHOD OF PROVIDING NON-DESTRUCTIVE INSPECTION FUNCTION, AND DEVICE THEREFOR

(71) Applicant: RAYDISOFT INC., Gwangmyeong-si (KR)

(72) Inventor: Seok Won Lee, Gwangmyeong-si (KR)

(73) Assignee: RAYDISOFT INC., Gwangmyeong-si (KR)

( * ) Notice: Subject to any disclaimer, the term of this patent is extended or adjusted under 35 U.S.C. 154(b) by 611 days.

(21) Appl. No.: 17/604,692

(22) PCT Filed: Aug. 7, 2020

(86) PCT No.: PCT/KR2020/010483
§ 371 (c)(1),
(2) Date: Oct. 18, 2021

(87) PCT Pub. No.: WO2021/029625
PCT Pub. Date: Feb. 18, 2021

(65) Prior Publication Data
US 2022/0215521 A1 Jul. 7, 2022

(30) Foreign Application Priority Data

Aug. 9, 2019 (KR) .................. 10-2019-0097473
Aug. 26, 2019 (KR) .................. 10-2019-0104345

(51) Int. Cl.
*G06T 7/00* (2017.01)
*G01N 23/04* (2018.01)
(Continued)

(52) U.S. Cl.
CPC ............ *G06T 7/001* (2013.01); *G01N 23/04* (2013.01); *G01N 23/083* (2013.01); *G01N 23/18* (2013.01);
(Continued)

(58) Field of Classification Search
CPC ...... G01N 23/04; G01N 23/083; G01N 23/18; G01N 2223/04; G01N 2223/401;
(Continued)

(56) References Cited

U.S. PATENT DOCUMENTS 4,513,316 A * 4/1985 Kobayashi ............. G01N 21/88
348/133
5,042,055 A * 8/1991 Wirt ....................... G01N 23/18
378/98.12
(Continued)

FOREIGN PATENT DOCUMENTS

JP 2012150065 A 8/2012
JP 2013246162 A 12/2013
(Continued)

OTHER PUBLICATIONS

International Search Report of PCT/KR2020/010483, Nov. 17, 2020, English translation.

*Primary Examiner* — Manav Seth
(74) *Attorney, Agent, or Firm* — STIP Law Group, LLC

(57) ABSTRACT

The present invention relates to a transmission image-based non-destructive inspecting method, a method of providing a non-destructive inspection function, and a device therefor. Specifically, when transmission images of industrial parts or electronic parts including an electronic circuit board mounted therein exist, the present invention enables various inspection methods to be used for the transmission images, so that a user can easily perform a defect inspection according to various situations.

5 Claims, 12 Drawing Sheets

(51) Int. Cl.
*G01N 23/083* (2018.01)
*G01N 23/18* (2018.01)
*G06F 3/04847* (2022.01)
*G06F 3/04817* (2022.01)
*G06F 3/0482* (2013.01)

(52) U.S. Cl.
CPC ..... *G06F 3/04847* (2013.01); *G01N 2223/04* (2013.01); *G01N 2223/401* (2013.01); *G06F 3/04817* (2013.01); *G06F 3/0482* (2013.01); *G06T 2200/24* (2013.01); *G06T 2207/10116* (2013.01); *G06T 2207/20092* (2013.01)

(58) Field of Classification Search
CPC ..... G01N 2223/419; G01N 2223/6113; G01N 21/95; G01N 21/956; G01N 21/8851; G01N 21/88; G01N 21/8803; G01N 2021/8854; G01N 2021/8861; G01N 2021/8864; G01N 2021/8874; G01N 2021/8877; G01N 2021/888; G01N 2021/8887; G01N 2223/611; G01N 2223/6116; G01N 23/046; G01N 23/06; G01N 23/185; G06F 3/04847; G06F 3/04817; G06F 3/0482; G06T 2200/24; G06T 2207/10116; G06T 2207/20092; G06T 2207/10081; G06T 2207/20021; G06T 2207/30141; G06T 2207/30152; G06T 7/11; G06T 7/0002; G06T 2207/30108–30164; G06T 2207/30168; G06T 7/0004–001; G06T 2207/10072; G06T 2207/10088; G06T 2207/10092; G06T 2207/10096; G06T 2207/10112; G06T 2207/10132; G06T 2207/10136; G06V 10/25; G06V 2201/07
See application file for complete search history.

(56) References Cited

U.S. PATENT DOCUMENTS

| | | | | |
|---|---|---|---|---|
| 5,255,329 A * | 10/1993 | Tanimizu | G06T 7/001 | 382/218 |
| 5,440,669 A * | 8/1995 | Rakuljic | G03H 1/0248 | |
| 5,493,594 A * | 2/1996 | Hamada | G01N 23/044 | 378/98.2 |
| 5,563,702 A * | 10/1996 | Emery | G01N 21/95607 | 356/73 |
| 5,699,447 A * | 12/1997 | Alumot | G01N 21/956 | 382/318 |
| 5,987,159 A * | 11/1999 | Nichani | G01N 21/88 | 382/199 |
| 6,282,309 B1 * | 8/2001 | Emery | G06T 7/001 | 382/145 |
| 6,333,991 B1 * | 12/2001 | Schreiber | G06T 5/50 | 382/132 |
| 6,433,561 B1 * | 8/2002 | Satya | G01R 31/307 | 324/762.01 |
| 6,836,560 B2 * | 12/2004 | Emery | G01N 21/95607 | 382/145 |
| 6,865,288 B1 * | 3/2005 | Shishido | G06T 7/001 | 382/141 |
| 7,126,681 B1 * | 10/2006 | Chen | G01N 21/956 | 356/237.4 |
| 7,157,703 B2 * | 1/2007 | Nakasuji | H01J 37/28 | 250/311 |
| 7,181,059 B2 * | 2/2007 | Duvdevani | G06V 10/94 | 382/199 |
| 7,211,449 B2 * | 5/2007 | Cao | H01L 22/34 | 438/14 |
| 7,239,735 B2 * | 7/2007 | Nozaki | G01R 31/311 | 702/81 |
| 7,369,236 B1 * | 5/2008 | Sali | G01N 21/95607 | 356/394 |
| 7,388,979 B2 * | 6/2008 | Sakai | G06T 7/001 | 700/121 |
| 7,415,362 B2 * | 8/2008 | Ueyama | G06T 7/0004 | 382/145 |
| 7,577,288 B2 * | 8/2009 | Yamashita | G06T 7/32 | 382/145 |
| 7,590,277 B2 * | 9/2009 | Oaki | G06T 7/001 | 382/141 |
| 7,764,826 B2 * | 7/2010 | Miyamoto | H01J 37/28 | 382/149 |
| 7,792,352 B2 * | 9/2010 | Sakai | G06T 7/001 | 382/218 |
| 7,809,181 B2 * | 10/2010 | Yamashita | G06V 10/24 | 382/209 |
| 7,916,286 B2 * | 3/2011 | Sali | G06T 7/001 | 356/394 |
| 8,170,347 B2 * | 5/2012 | Ancelin | G06F 18/22 | 382/218 |
| 8,213,703 B2 * | 7/2012 | Inoue | G06T 7/001 | 382/144 |
| 8,953,868 B2 * | 2/2015 | Murakami | G06T 7/001 | 382/141 |
| 9,117,137 B2 * | 8/2015 | Uchiyama | G06T 7/001 | |
| 10,360,670 B2 * | 7/2019 | Stuke | G01B 7/00 | |
| 11,308,622 B2 * | 4/2022 | Miyasa | G09G 5/377 | |
| 11,585,765 B1 * | 2/2023 | Kim | G06T 7/0004 | |
| 11,756,185 B2 * | 9/2023 | Hu | G06T 7/0008 | |
| 2002/0085761 A1 * | 7/2002 | Cao | H01L 22/34 | 382/209 |
| 2003/0179921 A1 * | 9/2003 | Sakai | G06T 7/0002 | 382/151 |
| 2006/0008140 A1 * | 1/2006 | Imamura | G06T 7/90 | 382/164 |
| 2007/0237385 A1 * | 10/2007 | Kato | G01N 21/9501 | 382/149 |
| 2008/0292176 A1 * | 11/2008 | Sakai | G06T 7/001 | 382/144 |
| 2011/0182495 A1 * | 7/2011 | Sun | G06T 7/48 | 382/141 |
| 2011/0262028 A1 * | 10/2011 | Lipson | G06F 16/5866 | 382/218 |
| 2013/0322737 A1 * | 12/2013 | Murakami | G06T 7/001 | 382/149 |
| 2024/0210939 A1 * | 6/2024 | Shu | B60W 60/001 | |

FOREIGN PATENT DOCUMENTS

| | | |
|---|---|---|
| KR | 20040067909 A | 7/2004 |
| KR | 20160149106 A | 12/2016 |
| KR | 102075872 B1 | 2/2020 |

* cited by examiner (a)

(b)

(a)

(b)

(c)

TRANSMISSION IMAGE-BASED NON-DESTRUCTIVE INSPECTING METHOD, METHOD OF PROVIDING NON-DESTRUCTIVE INSPECTION FUNCTION, AND DEVICE THEREFOR

CROSS-REFERENCE TO RELATED APPLICATIONS

This application is the U.S. National Phase under 35 U.S.C. § 371 of International Application No. PCT/KR2020/010483 filed on Aug. 7, 2020, which in turn claims the benefit of Korean Application No. 10-2019-0097473 filed on Aug. 9, 2019 and 10-2019-0104345 filed on Aug. 26, 2019, the disclosures of which are incorporated by reference into the present application.

TECHNICAL FIELD

The present invention relates to a non-destructive inspection method based on a transmission image, a method of providing a non-destructive inspection function, and an apparatus for the same, and specifically, when there are transmission images of electronic parts or industrial parts on which an electronic circuit board is mounted, various inspection methods can be used targeting these transmission images so that a user may easily perform defect inspection in accordance with various situations.

BACKGROUND ART

In order to effectively inspect electronic parts or various industrial parts on which an electronic circuit board is mounted, particularly, to inspect internal states of the parts, conventionally, there are inspection techniques such as X-ray or the like using a transmission image, and demand for the inspection techniques continuously increases until today.

Meanwhile, representative examples of the electronic parts or industrial parts include Ball Grid Array (BGA), Land Grid Array (LGA), Quad Flat Package (QFP), and Quad Flat Non-lead Package (QFN), and in order to inspect these electronic parts, techniques capable of automatically recognizing a plurality of inspection targets and effectively inspecting internal voids, solder areas, location-based defects and the like is indispensable.

On the other hand, although demand for three-dimensionally inspecting inside of an object using an X-ray tomography image is also increasing, due to various artifacts (ring artifact, beam hardening, scattering, cone beam, cupping artifact, etc.), actual inspection is limited to the level of performing inspection by directly setting an inspection region in a cross-sectional image of a direction that an inspector desires to examine.

Accordingly, for both inspections that use two-dimensional transmission images and X-ray tomography images, presently, it needs to develop an inspection method that can efficiently set an inspection region and satisfy all inspection factors required in the industry.

The present invention has been derived in view of the problems and invented to provide additional technical elements that cannot be easily invented by those skilled in the art, as well as being able to solve the technical problems described above.

DISCLOSURE OF INVENTION

Technical Problem

The present invention relates to a method of performing non-destructive inspection based on two-dimensional transmission images or tomography images photographing an arbitrary target, and a method of providing a non-destructive inspection function, and an object of the present invention is to allow an inspector to select a region to be examined and various inspection parameters and inspection methods finely and according to a situation so that defects may be detected rapidly and accurately compared to a conventional method.

In particular, another object of the present invention is to allow an inspector to accurately identify defects even in a target, the defects of which cannot be easily identified in a conventional method as it has a complicated structure or uneven thickness, according to parameters or templates set in advance.

Another object of the present invention is to make it possible to identify defects even in tomography images, and particularly, to accurately identify defects even when the tomography images are not properly aligned, in contrast to the limitation of conventional methods that may not perform accurate inspection as the tomography images are not properly aligned when the conventional methods perform non-destructive inspection on the tomography images.

In addition, another object of the present invention is to enhance accuracy of defect identification rate by providing a methodology for identifying defects on the basis of a relative area for the structures of a formalized shape constituting a target and acquiring more accurate values when a reference value for determining existence of a defect is calculated based on the relative area.

Technical Solution

To solve the problems described above, a non-destructive inspection method based on a transmission image according to the present invention may comprise the steps of: setting an inspection template; loading a target image; and performing non-destructive inspection by applying the inspection template to the target image.

In addition, in the method described above, the step of performing non-destructive inspection by applying the inspection template to the target image may include the steps of: performing image preprocessing on the target image; and identifying a defect in at least one region of interest (ROI) specified on the target image by the inspection template.

In addition, in the method described above, the step of performing non-destructive inspection by applying the inspection template to the target image may include the steps of: performing image preprocessing on the target image; extracting one or more object regions from the region of interest; and identifying a defect in the object region.

In addition, in the method described above, the step of performing non-destructive inspection by applying the inspection template to the target image may include the steps of: performing image preprocessing on the target image; defining a plurality of subregions of interest in the region of interest; defining a shape of a subregion of interest based on a shape of the set subregions of interest; determining the subregions of interest in the region of interest by referring to the defined shape of a subregion of interest; and identifying a defect in the determined subregions of interest.

Meanwhile, in a computer-readable storage medium storing commands for performing a non-destructive inspection method based on a transmission image according to another embodiment, the method may comprise the steps of: setting an inspection template; loading a target image; and performing non-destructive inspection by applying the inspection template to the target image.

In addition, a method of providing a non-destructive inspection function in a non-destructive inspection apparatus having a display according to still another embodiment of the present invention may comprise the steps of: when a user input for an inspection template creation menu is received, displaying a first user interface including a plurality of icons on the non-destructive inspection apparatus; receiving the user input while the first user interface is displayed; and creating and setting an inspection template according to the received user input.

In addition, in the method described above, the first user interface may further include an inspection parameter input area for setting a plurality of inspection parameters.

In addition, the method may include the steps of: when a user input for an automatic inspection menu is received, displaying a second user interface including a plurality of icons and a current inspection state window on the non-destructive inspection apparatus; receiving the user input while the second user interface is displayed; and performing defect inspection on a plurality of target images according to the received user input.

Meanwhile, in a computer-readable storage medium storing commands for performing a method of providing a non-destructive inspection function in a non-destructive inspection apparatus having a display according to still another embodiment of the present invention, the method may comprise the steps of: when a user input for an inspection template creation menu is received, displaying a first user interface including a plurality of icons on the non-destructive inspection apparatus; receiving the user input while the first user interface is displayed; and creating and setting an inspection template according to the received user input.

Advantageous Effects

According to the present invention, there is an effect of providing an environment in which an inspector can finely set various parameters and templates for non-destructive inspection, and also allowing the inspector to perform non-destructive inspection by selecting an appropriate inspection method according to a target or a situation.

In addition, according to the present invention, there is an effect of quickly and accurately detecting defects when a two-dimensional transmission image exists although a target has a complicated structure.

In addition, according to the present invention, there is an effect of accurately identifying defects without an error even in a tomography image, which are difficult to detect in the prior art.

In addition, according to the present invention, there is an effect of enhancing accuracy of defect identification rate during a non-destructive inspection based on a relative area compared with a conventional method.

BRIEF DESCRIPTION OF THE DRAWINGS

FIG. 5 is a flowchart illustrating in order particularly the process of a second inspection method included in a non-destructive inspection method according to the present invention.

FIG. 6 (a), FIG. 6(b) and FIG. 6(c) are a view showing a target image on which a second inspection method has been performed.

BEST MODE FOR CARRYING OUT THE INVENTION

Figure 1:
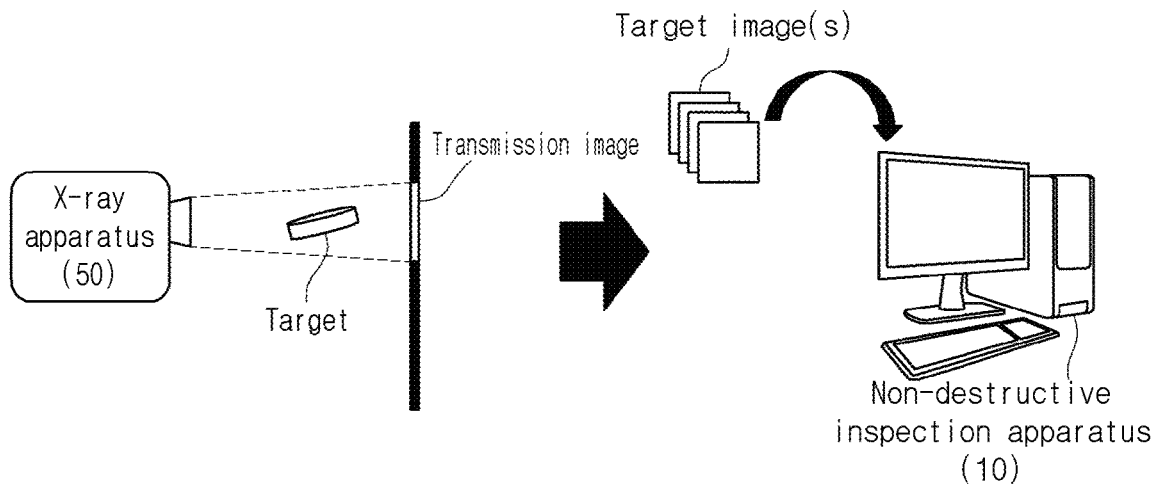
FIG. 1 is a view schematically showing the process of a general non-destructive inspection.

Details of the objects, the technical configurations of the present invention, and the effect of the operation thereof will be more clearly understood by the following detailed description based on the drawings attached in the specification of the present invention. Embodiments according to the present invention will be described in detail with reference to the accompanying drawings.

The embodiments disclosed in this specification should not be interpreted or used as limiting the scope of the present invention. It is natural for those skilled in the art that the description including the embodiments of the present specification has various applications. Accordingly, the embodiments described in the detailed description of the present invention are exemplary for better describing of the present invention, and it is not intended that the scope of the present invention is limited to the embodiments.

The functional blocks shown in the drawings and described below are only examples of possible implementations. In other implementations, other functional blocks may be used without departing from the spirit and scope of the detailed description. Further, although one or more functional blocks of the present invention are expressed as individual blocks, one or more of the functional blocks of the present invention may be a combination of various hardware and software configurations that perform the same function.

In addition, an expression including certain components is an expression of "open type" and merely refers to existence of corresponding components, and should not be understood as excluding additional components.

Furthermore, when a component is referred to as being "connected" or "coupled" to another component, although the component may be directly connected or coupled to another component, it should be understood that other components may exist therebetween.

Prior to full-fledged description, first, a system and a process for providing non-destructive inspection based on a transmission image will be described with reference to FIGS. 1 and 2.

First, FIG. 1 is a view showing a schematic configuration of non-destructive inspection based on a transmission image. The non-destructive inspection refers to a method of inspecting internal states of a target such as a circuit or the like without destroying the target, and the method includes radiographic testing, ultrasonic testing, magnetic particle testing, electromagnetic induction testing, and the like. Since it is general that a target such as a circuit or the like is not uniform and perfect in quality overall, it needs to detect defects by examining whether or not the target sufficiently satisfies required conditions, and the present invention relates to a process of finding the defects. Referring to FIG. 1, since the non-destructive inspection is based on the assumption of analyzing transmission images, a transmission image of a target is necessarily required in order to utilize the present invention. In this case, the target means an object for identifying whether or not a defect exists therein, and types of the target may include electronic components or industrial components, for example, circuit boards, fine pipes, panels, and the like. In addition, generation of a transmission image may be performed according to various existing methods, such as the aforementioned radiographic testing, ultrasonic testing, magnetic particle testing, electromagnetic induction testing, and the like. However, in this detailed description, it is described assuming that a transmission image of a target is generated using an x-ray apparatus 50 to help understanding of the present invention.

After the transmission image(s) is generated, the transmission images are converted into images of a computer-readable form and transmitted to a non-destructive inspection apparatus 10 according to the present invention. In this case, the image of a computer-readable form will be referred to as a target image(s) in this detailed description.

In relation to the non-destructive inspection apparatus 10, it is assumed that the configuration includes a central processing unit (CPU) and a memory from the aspect of a device. The central processing unit may also be referred to as a controller, a microcontroller, a microprocessor, a microcomputer, or the like. In addition, the central processing unit may be implemented using hardware, firmware, software, or a combination these, and when the CPU is implemented using hardware, the hardware may be configured to include application specific integrated circuit (ASIC), digital signal processor (DSP), digital signal processing device (DSPD), programmable logic device (PLD), field programmable gate array (FPGA), and the like, and when the CPU is implemented using firmware or software, the firmware or software may be configured to include modules, procedures, functions and the like that perform the above functions or operations. In addition, the memory may be implemented as Read Only Memory (ROM), Random Access Memory (RAM), Erasable Programmable Read Only Memory (EPROM), Electrically Erasable Programmable Read-Only Memory (EEPROM), flash memory, Static RAM (SRAM), a hard disk drive (HDD), a solid-state drive (SSD), or the like. In addition, the non-destructive inspection apparatus 10 may further include a communication device for transmitting and receiving data to and from an external terminal or an external local server, in addition to the central processing unit and the memory.

In addition, the non-destructive inspection apparatus 10 may further include a display. That is, a means capable of displaying interfaces to a user is required in order to provide a non-destructive inspection function described below, and regardless of a display type, all devices capable of visually displaying an interface to the user may be a type of the display.

On the other hand, seeing from the functional aspect of the non-destructive inspection apparatus 10, the apparatus may perform image processing on a plurality of target image(s) using the hardware described above, and in this process, a user interface that allows a user to perform various inputs, i.e., a user interface capable of input so that a user may execute an arbitrary function, may be provided. That is, the non-destructive inspection apparatus 10 may provide an inspector with a result of performing inspection on a target or a plurality of targets by performing various inspection methods targeting a plurality of target image(s). A specific process of providing a non-destructive inspection function by the non-destructive inspection apparatus 10 will be described below with reference to the accompanying drawings.

Figure 2:
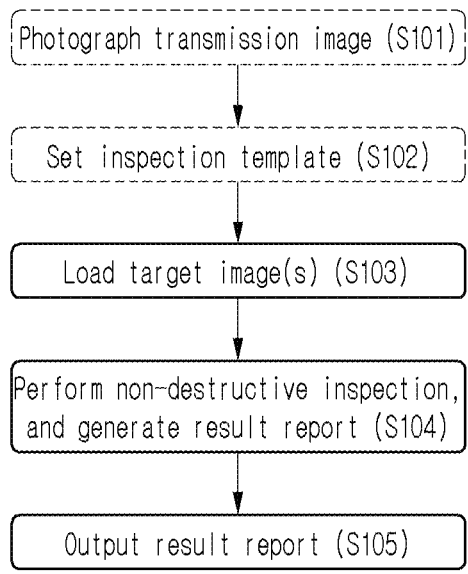
FIG. 2 is a flowchart illustrating in order a non-destructive inspection method based on a transmission image according to the present invention.

FIG. 2 is a flowchart schematically illustrating in order a process of performing non-destructive inspection provided according to the present invention.

Referring to FIG. 2, the step performed first is a step of capturing a transmission image of a target (S101), and this step may be performed by an X-ray apparatus 50. The x-ray apparatus 50 may be connected to the non-destructive inspection apparatus 10 described above through a network, and may perform X-ray imaging on a specific target according to input of an inspector handling the non-destructive inspection apparatus 10. Meanwhile, a transmission image of the target may be generated after the imaging is completed by the x-ray device 50, and this is converted into the format of the target image(s) and transferred to the non-destructive inspection apparatus to proceed to the next step. At this point, the transmission images are already computer-readable by themselves and may not need to be converted into separate target image(s), and in this case, the transmission images may be treated as being the same as the target image.

After the transmission image photographing step (S101), an input of the inspector may be received to perform setting of an inspection template on the non-destructive inspection apparatus 10 (S102). The inspection template may be understood as a set of parameter values input by the inspector in order to effectively identify a defect in an arbitrary target image. The inspection template may be set based on the parameter values input by the inspector through input devices (keyboard, mouse, etc.) connected to the non-destructive inspection apparatus 10, and the types of these parameters may include an inspection tool, an inspection purpose, a location of a region of interest, a shape of a region of interest, a size of a region of interest, a preprocessing method, an extraction method, defect determination criteria, and the like, and furthermore, alignment and correction of a target image, and the position, rotation, magnification, and actual size conversion ratio per pixel of the target image may be further included. Meanwhile, step S102 may include the processes of inputting various parameters by a user through a first user interface described below in the description portion after FIG. 10 of this detailed description. The first user interface will be described in more detail after FIG. 10.

Returning to FIG. 2 again, after step S102, the non-destructive inspection apparatus 10 loads the target image(s) of the target (S103) to prepare for full-fledged defect identification, performs non-destructive inspection and generates a result report after the target image(s) is loaded (S104), and finally outputs the generated result report on the screen so that the inspector may see (S105).

The steps described in FIG. 2 illustrate the most general steps of the non-destructive inspection method according to the present invention, and hereinafter, the non-destructive inspection method according to the present invention will be described by dividing the method into three inspection methods according to the method of performing the non-destructive inspection.

The non-destructive inspection method according to the present invention includes three types of specific inspection methods, and they may be briefly described such that a first inspection method is an inspection method for repetitively identifying, when there exists a plurality of regions of interest, whether there exists a combination of corresponding regions, a second inspection method is an inspection method for identifying, especially when the target images are tomography images of an arbitrary target, whether there exists a defect in the tomography images, and a third inspection method is an inspection method for identifying, when there exists a plurality of object regions having similar shapes in one target image, regions having a defect from the object regions by performing an operation process based on a relative area. Hereinafter, each of the inspection methods will be described in detail.

<First Inspection Method>

Figure 3:
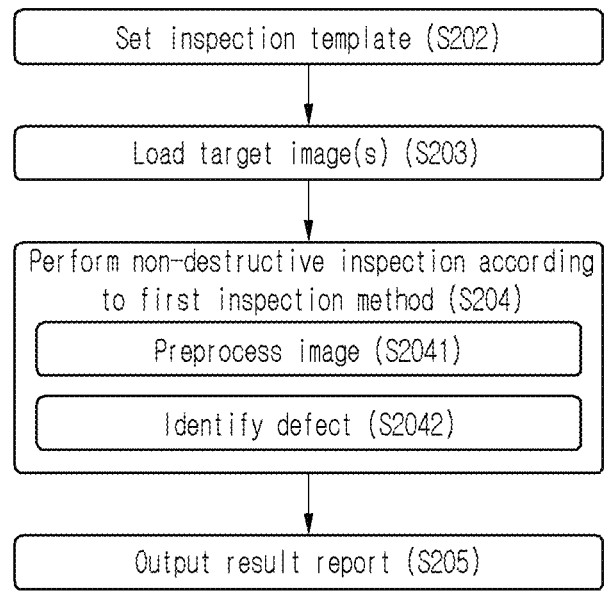
FIG. 3 is a flowchart illustrating in order particularly the process of a first inspection method included in a non-destructive inspection method according to the present invention.

FIG. 3 is a flowchart illustrating the processes performed when non-destructive inspection is performed according to the first inspection method. As described above, the first inspection method is for repetitively identifying whether there exists a defect in corresponding regions when there is a plurality of regions of interest, and for example, it is a method of repetitively identifying whether there is a defect in each of the target images photographing circuit boards manufactured in large quantities, i.e., each of the target images photographing, in large quantities, circuit designs of the same configuration and circuit boards produced according to the same design.

On the assumption that a transmission image of the target already exists, the first inspection method may first start from a step of receiving an input from the inspector and setting an inspection template by the non-destructive inspection apparatus 10 (S202). The step of setting an inspection template in the first inspection method may also be understood mainly as a step of specifying regions in a target on which the inspection will be performed, i.e., a so-called region of interest, and setting various parameters for performing defect inspection in the region, by the inspector. The region of interest refers to a region in which the inspector desires to identify whether there is a defect, and for example, when one circuit board is captured wholly as one target image, the target image may include a region that does not need to be examined for existence of defects (e.g., a substrate region where no devices are provided) and a region that should be examined for existence of defects, and this step is to increase the image processing speed and work efficiency by setting in advance a region that needs defect inspection.

At step S202, as inputs of various parameters are received from the inspector (in this case, receiving an input means receiving an input using an input device such as a keyboard, a mouse or the like) and the inputs of the parameters are stored, inspection of the same method may be performed for a plurality of target images that will to be loaded in the future.

Describing the parameters that can be set at step S202, first, parameters related to image preprocessing (preprocessing parameters, referred to as first group parameters for convenience) may include the number of times of smooth-processing a target image and a pixel value of a kernel size, a value indicating whether or not to correct a peripheral brightness value in the target image, an approximate size of a region (object region) having a meaningful pixel value in a region of interest, a value indicating whether an object region in a region of interest is brighter or darker than the periphery, a value indicating a range, to which an object region to be searched within a region of interest belongs, based on the intensity value of each pixel, and the like. The above parameters related to image preprocessing are values needed for preprocessing a corresponding target image in various methods prior to full-fledged defect identification in order to more accurately find a subregion of interest or an object region to be searched from a region of interest set by the inspector for the target image that is loaded for defect inspection.

Meanwhile, segmentation parameters (referred to as second group parameters for convenience) for identifying an object region or a defective region in the region of interest specified by the inspector may also be included in the parameters that can be set at step S202. The types of these second group parameters may also include a threshold value that can be a reference value when an object region or a defective region is identified or a subregion of interest is defined, a minimum area needed to recognize a region as an object region or a subregion of interest, a shape of a subregion of interest, definition of a plurality of subregions of interest, the number and intervals of rows and the number and intervals of columns of subregions of interest when the subregions of interest are listed, and the like.

The threshold value among the parameters is a value used as a criterion for determining whether an object region exists in the region of interest specified by the inspector and determining whether a defect exists in the object region, and the threshold value may be an intensity value indicating a brightness value of an arbitrary pixel or may be a gray value or an RGB value according to intention of the designer. Throughout this detailed description, it will be described on the assumption that the threshold value is an intensity value indicating a brightness value of a pixel, unless otherwise specified, to help understanding of the invention. On the other hand, although the threshold value may be used to identify various defective or other meaningful regions on the basis of a corresponding value by receiving a fixed threshold value directly from the inspector, alternatively, when an input for selecting 'automatic threshold value' is received from the inspector, the defective or meaningful regions may be identified on the basis of an automatic threshold value. When inspection is performed on the basis of an automatic threshold value, the inspection is performed according to a threshold value randomly selected by the non-destructive inspection apparatus 10 according to the present invention based on distribution of image brightness values. In addition, the threshold value may be a reference value used when an arbitrary range is determined in identifying a defective region or an object region, and for example, when the brightness value of each pixel in a target image has a difference value within a predetermined range based on the threshold value, corresponding pixels may be identified as a defective region or an object region.

On the other hand, in relation to the shape of a subregion of interest among the parameters, when an object region is identified within the region of interest specified by the inspector by performing inspection in the future, a subregion of interest may be defined on the basis of a center value found based on the coordinates of the object region (coordinates obtained by adding all X-axis and Y-axis coordinates of each axis and then calculating an average) or a center point found based on the intensity values that the coordinates in the object region have, and the shape of the subregion of interest may be determined by the inspector by inputting together when the second group parameters are input. The shape of the subregion of interest may include, for example, [outline], [circle], and [rectangle], and when [Outline] is selected, the subregion of interest will be defined in a shape exactly the same as that of the object region identified based on the threshold value, and when [Circle] or [Rectangle] is selected, the subregion of interest will be defined as a circle or a rectangle around the center value or the center point. When it is desired to define the subregion of interest as a circle or a rectangle, an input of diameter or width/height values may be further received from the inspector.

On the other hand, evaluation parameters (referred to as third group parameters for convenience) for the identified object region may be further included in the parameters that can be set at step S202. For example, it can be set through input of parameters to determine a situation as short circuit when object regions that should exist in different subregions of interest are connected to each other, and in addition, it can be set through input of parameters to determine a situation also as a defect when an object region that should exist in an arbitrary subregion of interest without being in touch is in touch with the boundary of the subregion of interest. In addition, whether it is determined as an insufficient solder defect or an excessive solder defect based on a relative area when a plurality of objects is identified may also be set through input of parameters. Meanwhile, after receiving the input from the inspector and setting the inspection template at step S202, the non-destructive inspection apparatus 10 loads images to be inspected, i.e., target image(s) (S203).

After loading the target image(s), the non-destructive inspection apparatus 10 performs full-fledged non-destructive inspection according to the first inspection method (S204), and this step may include an image preprocessing step (S2041), and a defect identification step (S2042).

The image preprocessing step (S2041) may include performing image processing, at least one among smoothing, masking, and flattening, on the target image(s) to enhance identification capability before performing full-fledged defect identification on the target image(s). At this point, it is natural in performing this step that the parameters previously set for image preprocessing in the inspection template may be referenced, and additional image preprocessing for enhancing the defect identification capability may be performed although no other parameters are additionally set. Since various methods are commercialized conventionally as a method of preprocessing an image, detailed descriptions of each preprocessing method will be omitted in this detailed description. In addition, although step S2041 has been described as a preprocessing step that is performed immediately after the target image(s) is loaded, it should be understood that this step is not performed only at any one time point, and may be performed as needed in the middle of the defect identification step described below.

Figure 4:
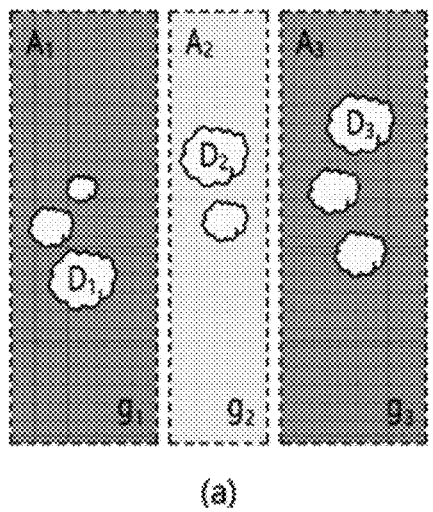
FIG. 4(a) and FIG. 4(b) are a view showing the process of setting a template when a first inspection method is performed.
Figure 4:
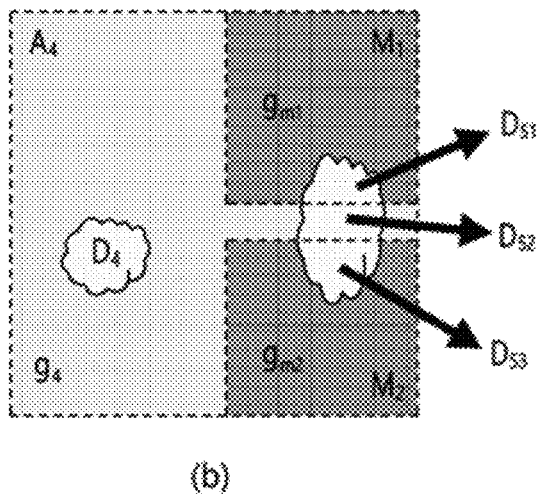

Meanwhile, after the image preprocessing is performed, the defect identification step S2042 may be performed, and this will be described with reference to FIG. 4.

FIG. 4(a) is a view showing the process of recognizing three regions of interest as A1, A2, and A3 in a target image by the non-destructive inspection apparatus 10 on the basis of the inspection template set by the inspector. (For reference, it will be described in this embodiment on the assumption that the user specifies A1, A2, and A3 as regions of interest. However, A1, A2, and A3 may be regions identified as object regions by the non-destructive inspection apparatus within a region of interest arbitrarily specified by a user.) Since the regions of interest are, for example, regions of a circuit board in which coating layers are formed using different materials, they may be directly specified as regions of interest by the inspector. For reference, the regions of interest may be set within the target image based on an arbitrarily set coordinate system or a position of a pixel.

Meanwhile, at step S202, it has been described that a threshold value unique to a corresponding region of interest, i.e., a threshold value used as a criterion for determining whether a defect exists in the region of interest in the future, may be further set as soon as the regions of interest are specified. In FIG. 4(a), the threshold values are expressed as g1, g2, and g3, and preferably, these threshold values may be an intensity value indicating a brightness value of an arbitrary pixel in each region of interest, or may be a gray value or an RGB value according to intention of the designer. At this point, the mentioned threshold values are not necessarily limited to those mentioned above, and as long as the threshold values are computer-readable values and each pixel can be distinguished, the types thereof will not be limited. In relation to utilization of the threshold values, the non-destructive inspection apparatus 10 may use the threshold values to be compared with a value in each region of interest and define or identify a region having a value exceeding the threshold value as much as a preset range as a defective region. For example, when the threshold value in the region of interest A1 is g1, and there are pixels having a value exceeding the threshold value as much as a range of −10% to 10% compared with g1, a set of corresponding pixels may be identified as a defective region. Alternatively, when the threshold value in the region of interest A1 is g1, it may be implemented to identify all pixels having a value different from g1 as a defective region.

Meanwhile, FIG. 4(b) is a view illustrating a defect identification step when a masking region is further included. Although only an embodiment of specifying a region of interest has been described at step S202, a masking region may also be specified at step S202, in addition to receiving and specifying a region of interest from the inspector. Although the masking region is, for example, a region that exists in the same layer on the circuit board, some regions may have an obstacle on the circuit board and thus have a threshold value darker than that of a region without having an obstacle when a transmission image is generated, and the masking region means a region in which the threshold value varies due to existence of an obstacle among the regions in the same region of interest. In relation to this, FIG. 4(b) shows a region of interest A4 and two masking regions M1 and M2 existing in the region of interest. The masking regions may have a threshold value unique to each of the masking regions, and as shown in FIG. 4(b), a unique threshold value such as gm1 or gm2 may be set for each of the masking regions. In relation to utilization of the unique threshold values of the masking regions, it can be implemented such that when pixels having a value exceeding a preset range compared with threshold g4 in region A4 are recognized as a defective region and defined as D4, defective regions are identified for defect D5 existing across masking region M1, region of interest A4, and masking region M2 on the basis of gm1, g3, and gm2, and then recognized as one defective region considering the connection relation of the defective regions in the regions. Unlike FIG. 4(b), when the defects exist only inside the regions M1 and M2 and there is no defect having connectivity in the regions other than the masking regions, it will be natural to recognize the defects as separated defects.

As described with reference to FIG. 4, the non-destructive inspection apparatus 10 according to the present invention may identify defects in a region of interest specified by the inspector by performing non-destructive inspection including the image preprocessing step (S2041) and the defect identification step (S2042).

Meanwhile, although step S204 described above may be configured of only a step of determining whether a defect exists by directly comparing pixel values in the regions of interest with a threshold value, it may also be implemented in the following manner. That is, in performing non-destructive inspection, the non-destructive inspection apparatus 10 may perform the steps of extracting at least one object region from each region of interest, performing image processing to identify defect candidate regions in each object region, identifying defect candidate regions, and determining a defect candidate region as a defective region. The object region may be defined as a region configured of sets of pixels having similar values in each region of interest, and preferably, may be defined as a region having an arbitrary area inside a closed curve. For example, based FIG. 4(a), there may be a total of three defective regions and a region of interest A1 other than the defective regions in the region of interest A1 as a result, and at the step of extracting an object region, a region of the sets of pixels having similar values inside the closed curve is first identified as an object region before the region is classified into a defective region or a normal region. Next, since the step of performing image processing to identify defect candidate regions in each object region is similar to general image processing, detailed description thereof will be omitted. Next, the step of identifying defect candidate regions is a step of identifying candidate regions that should be determined as a defective region among the previously extracted object regions, and at this step, conditions set for each region at the step of setting an inspection template in advance may be utilized. For example, when a plurality of pixels having a value exceeding the threshold value as much as a preset range is included in each of the object regions, the object region will be classified as a defective candidate region, and other object regions may be excluded from being classified as a defective candidate region. Finally, at the step of determining a defect candidate region as a defective region, a defect candidate region satisfying secondary requirements among the defect candidate regions is determined as a defective region, and when there is a defect candidate region that does not satisfy the secondary requirements, the defect candidate region is not determined as a defective region.

As described above, the method of performing non-destructive inspection using the first inspection method may be implemented in various processes, and as far as a defect is identified by setting regions of interest and comparing with a threshold value, it will be included within the scope of the present invention described in the detailed description.

Meanwhile, when non-destructive inspection is performed according to the first inspection method, at least the result values calculated by the following equations may be displayed in a result report generated by the non-destructive inspection apparatus 10.

$$\text{Sum Total of Voids Ratio (\%)} = \frac{\sum_{j=1}^{N} \sum_{i=1}^{k_j} d_i}{\sum_{j=1}^{N} A_j} * 100 \quad \text{[Equation 1]}$$

$$\text{Maxumum Voids Area Ratio (\%)} = \frac{\text{Max}[dk_i]}{\sum_{j=1}^{N} A_j} * 100 \quad \text{[Equation 2]}$$

In addition, when the non-destructive inspection apparatus 10 generates a result report, it may include a process of grouping the regions of interest set before, and a process of integrating inspection results by group. That is, according to input of the inspector, the non-destructive inspection apparatus 10 may put together some specified regions of interest among a plurality of regions of interest and set the specified regions of interest as one group, and then distinguish only the defects generated in the group and display the defects on the report, and through this process, the inspector may receive a defect result report of a desired form.

<Second Inspection Method>

Figure 5:
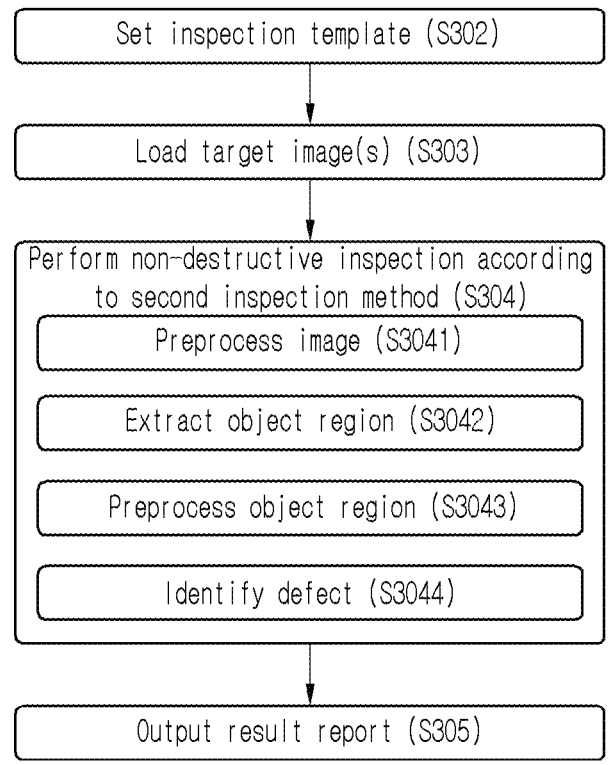
FIG. 5 is a view showing target images on which a first inspection method has been performed.

FIG. 5 is a flowchart illustrating the processes of performing non-destructive inspection according to a second inspection method. The second inspection method is to identify defects targeting a plurality of tomography images when tomography is performed on a certain target, and for example, this is an inspection method of determining whether there is a defect in each tomography image by performing image-processing on tomography images in order when a plurality of tomography images is generated by performing tomography in order to see whether a defect exists inside a target having an arbitrary volume.

The second inspection method may first start from the step of receiving an input from the inspector and setting an inspection template, by the non-destructive inspection apparatus (S302). The step of setting an inspection template in the second inspection method, i.e., creating and editing an inspection template, may be configured of a step of receiving and storing parameter values for identifying or defining an object region or a subregion of interest including the object region on the assumption that an inspection template has been created by the inspector by specifying an arbitrary region of interest through dragging or the like. For reference, the region of interest in the second inspection method may be understood to mean a region always including an object region that the inspector desires to see, particularly considering that a plurality of tomography images has object regions of different shapes and considering that the tomography images are not always aligned accurately.

Although many of the parameters that can be set at step S302 may be duplicated with the parameters set at step S202, they are summarized once again as follows.

Parameters related to image preprocessing (referred to as first group parameters for convenience) may include the number of times of smooth-processing a target image and a pixel value of a kernel size, the number of times of smoothing an object region itself and a pixel value of a kernel size, a value indicating whether or not to correct a peripheral brightness value in the target image, a value indicating whether or not to correct a peripheral brightness value to detect a defective region in an object region, an approximate size of an object region or a defective region, a value indicating whether an object region in a region of interest is brighter or darker than the periphery, a value indicating a range, to which an object region to be searched within a region of interest belongs, based on the intensity value of each pixel, a range of detecting a void area in an object region based on an intensity value, and the like.

Meanwhile, parameters (referred to as second group parameters for convenience) for identifying an object region or a defective region in a region of interest may also be included in the parameters that can be set at step S302. The types of these parameters may include a threshold value for identifying an object region, a threshold value for identifying a defective region, a minimum area for recognizing a region as an object region, a minimum/maximum area for recognizing a region as a defective region, and the like. Meanwhile, the threshold value for identifying an object region or the threshold value for identifying a defective region may be set as a fixed threshold value or an automatic threshold value similar to those mentioned in the first inspection method.

On the other hand, evaluation parameters (referred to as third group parameters for convenience) for the identified defective region may be further included in the parameters that can be set at step S302. The parameters may include, for example, the total area of object regions that fall into the normal category and the number of object regions, the area of the minimum/maximum defective region that falls into the normal category, the minimum/maximum value of the total area of a defective region that fall into the normal category, the number, area, and size of defects that fall into the normal category, and the like.

Meanwhile, after receiving the input from the inspector and setting the inspection template at step S302, the non-destructive inspection apparatus 10 loads images to be inspected, i.e., tomography images (S303).

After loading the target image, the non-destructive inspection apparatus 10 performs full-fledged non-destructive inspection according to the second inspection method (S304), and this step may include an image preprocessing step (S3041), an object region extraction step (S3042), an object region preprocessing step (S3043), and a defect identification step (S3044).

Since the image preprocessing step S3041 may be performed to be similar to that of the first inspection method, detailed descriptions will be omitted in this paragraph.

After the image preprocessing is performed, an object region is extracted, and the corresponding region is preprocessed, and finally, defects are identified (S3042 to S3044), and this will be described with reference to FIG. 6.

Figure 6A:
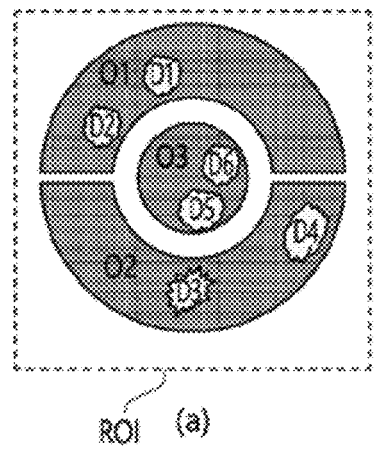
FIG. 6(a), FIG. 6(b) and FIG. 6(c) are a view showing a result of actually performing defect inspection according to a first inspection method.
Figure 6B:
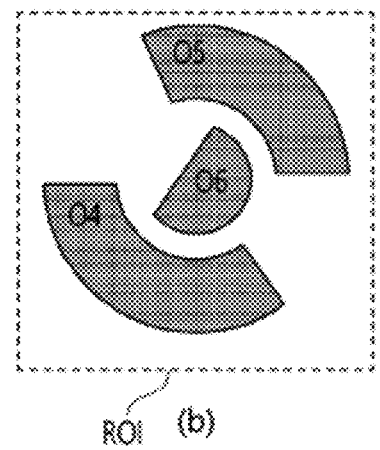
Figure 6C:
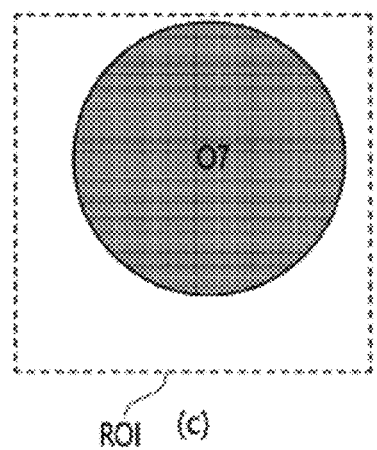

FIGS. 6(a), 6(b), and 6(c) are views showing tomography images obtained by performing tomography on a certain target, i.e., target images, and at this point, it can be confirmed that a region of interest is set as a dotted rectangular region, which is a region that can cover all the outermost parts of the object regions.

After performing image preprocessing, the non-destructive inspection apparatus 10 extracts each tomography image, i.e., an object region of the target image. The object region in the second inspection method may be defined as a region configured of sets of pixels having similar values within each region of interest as shown in the first inspection method, and preferably, may be defined as a region having an arbitrary area inside a closed curve. In FIGS. 6(a) to 6(c), it may be confirmed that the object regions are marked as O1 to O7, respectively. That is, the object regions in the second inspection method mean regions to be recognized as meaningful parts within the region of interest, which are identified based on a brightness value or an intensity value, and the object region extraction step (S3042) like this should be performed for each tomography image (target image) in that each tomography image (target image) includes a meaningful region of a different shape, i.e., all the tomography images (target images) include an object region of an irregular shape.

The threshold value previously set in the inspection template may be used in the process of extracting an object region, and for example, when values of pixels are compared with each other and the difference is within a preset range, i.e., when it is determined that the pixel values are similar to each other, the object region may be extracted by treating the object regions as one region, and otherwise treating the object regions as different regions.

Meanwhile, after the object region is extracted from the region of interest, the non-destructive inspection apparatus may perform preprocessing on each object region (S3043), and after performing the preprocessing, the step of identifying a defect (S3044) may be performed. The step of identifying a defect in an object region may also use a method of identifying pixels having a value exceeding a preset range from the threshold value of each object region as a defect as described in the first inspection method, or a method of identifying defect candidates and determining defects therefrom as described in the first inspection method. Since the method of identifying a defect in an object region is similar to that of the first inspection method, detailed description will be omitted here. For reference, FIG. 6(a) is a view showing an example in which defects D1 and D2 exist in object region O1, defects D3 and D4 in object region O2, and defects D5 and D6 in object region O3.

On the other hand, when non-destructive inspection is performed according to the second inspection method, at least result values obtained from the following equations may be displayed a result report generated by the non-destructive inspection apparatus 10.

$$\text{Sum Total of Voids in } ROI \text{ Ratio (\%)} = \frac{\sum_{j=1}^{N} \sum_{i=1}^{k_j} d_i}{\sum_{j=1}^{N} O_j} * 100 \quad [\text{Equation 3}]$$

$$\text{Sum Total of Voids in Each Object Ratio (\%)} = \frac{\sum_{i=1}^{k_j} d_i}{O_j} * 100 \quad [\text{Equation 4}]$$

$$\text{Maxumum Void Area in each Object Ratio (\%)} = \frac{\text{Max}[dk_i]}{O_j} * 100 \quad [\text{Equation 5}]$$

<Third Inspection Method>

Figure 7:
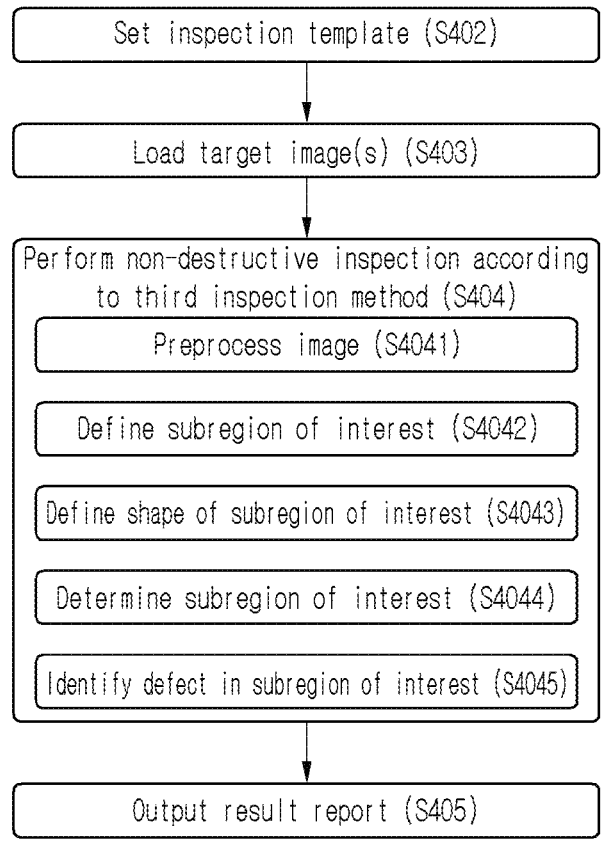
FIG. 7 is a flowchart illustrating in order particularly the process of a third inspection method included in a non-destructive inspection method according to the present invention.

FIG. 7 is a flowchart illustrating the processes of performing non-destructive inspection according to the third inspection method. The third inspection method is to identify objects having a defect by performing an operation based on a relative area when a plurality of objects having similar shapes exists in one target image.

The third inspection method may first start from the step of receiving an input from the inspector and setting an inspection template, by the non-destructive inspection apparatus (S402). The step of setting an inspection template in the third inspection method is similar to the step of setting an inspection template in the first inspection method described above. That is, at step S402, an inspection template may be set by receiving an input of each of the first group parameters, the second group parameters, and the third group parameters from the inspector. The inspection template of the third inspection method may include parameters that can be set in the first inspection method, and in some cases, parameters described in the second inspection method may also be included.

Meanwhile, after receiving the input from the inspector and setting the inspection template at step S402, the non-destructive inspection apparatus 10 loads images to be inspected, i.e., target image(s) (S403)

After loading the target image(s), the non-destructive inspection apparatus 10 performs full-fledged non-destructive inspection according to the third inspection method in earnest (S404), and this step may include an image preprocessing step (S4041), a subregion of interest definition step (S4042), a subregion of interest shape definition step (S4043), a subregion of interest identification and determination step (S4044), and a defect identification step (S4045).

The image preprocessing step (S4041) may include performing image processing, at least one among smoothing, masking, and flattening, on the target image(s) to enhance identification capability before performing full-fledged defect identification on the target image(s). At this point, it is natural in performing this step that the parameters previously set for image preprocessing in the inspection template may be referenced, and additional image preprocessing for enhancing the defect identification capability may be performed although no other parameters are additionally set. Since various methods are commercialized conventionally as a method of preprocessing an image, detailed descriptions of each preprocessing method will be omitted in this detailed description. In addition, although step S4041 has been described as a preprocessing step that is performed immediately after the target image(s) is loaded, it should be understood that this step is not performed only at any one time point, and may be performed as needed in the middle of the defect identification step described below.

Next, after the image preprocessing process, a step of defining a subregion of interest (S4042), a step of defining a shape of a subregion of interest (S4043), and a step of determining a subregion of interest (S4044) may be followed. The subregion of interest means a region that the inspector particularly desires to examine in a region of interest, and it means that individual regions of interest are set around the location of each object as a plurality of objects having similar shapes is arranged in a target image of the third inspection method. Meanwhile, a quite large number of objects may be included in a target image in some cases, and at this point, as it can be a very troublesome work for the inspector to specify and set subregions of interest of individual objects, the non-destructive inspection apparatus 10 according to the present invention may be implemented to define first a subregion of interest by receiving an input for defining the subregion of interest from the user (S4042), define a shape of the subregion of interest to be identified in the future referring to the previous definition of subregion of interest by the non-destructive inspection apparatus (S4043), and then identify and determine subregions of interest in the region of interest referring to the defined shape of the subregion of interest (S4044).

For reference, although step S4042 is expressed as a step of defining a subregion of interest of this detailed description, the corresponding step may also be understood as recognizing conditions for defining a subregion of interest, i.e., conditions for generating a subregion of interest, referring to an inspection template, by the non-destructive inspection apparatus 10 according to the present invention. In addition, step S4043 is a step of defining the shape of the subregion of interest, and at this point, the basic shape of the subregion of interest follows the previously set inspection template. That is, when setting the inspection template, the inspector may select [Outline], [Circle], [Rectangle], or the like as the shape of the subregion of interest, and when [Rectangle] is selected, the shape of the subregion of interest may be [Rectangle] by default. In addition, the step of identifying and determining a subregion of interest (S4044) may include, after the non-destructive inspection apparatus 10 first identifies object regions in the region of interest, a step of acquiring a center value of an object region found based on the coordinates of the object region (coordinates obtained by adding all X-axis and Y-axis coordinates of each axis and then calculating an average) or a center point calculated based on the intensity value of the coordinates in the object region (center point considering coordinates and intensity), and after the center value or the center point is acquired, a subregion of interest according to the specification (diameter, width/height, etc.) of a shape previously set by the inspector may be generated and determined around the one point.

Figure 9:
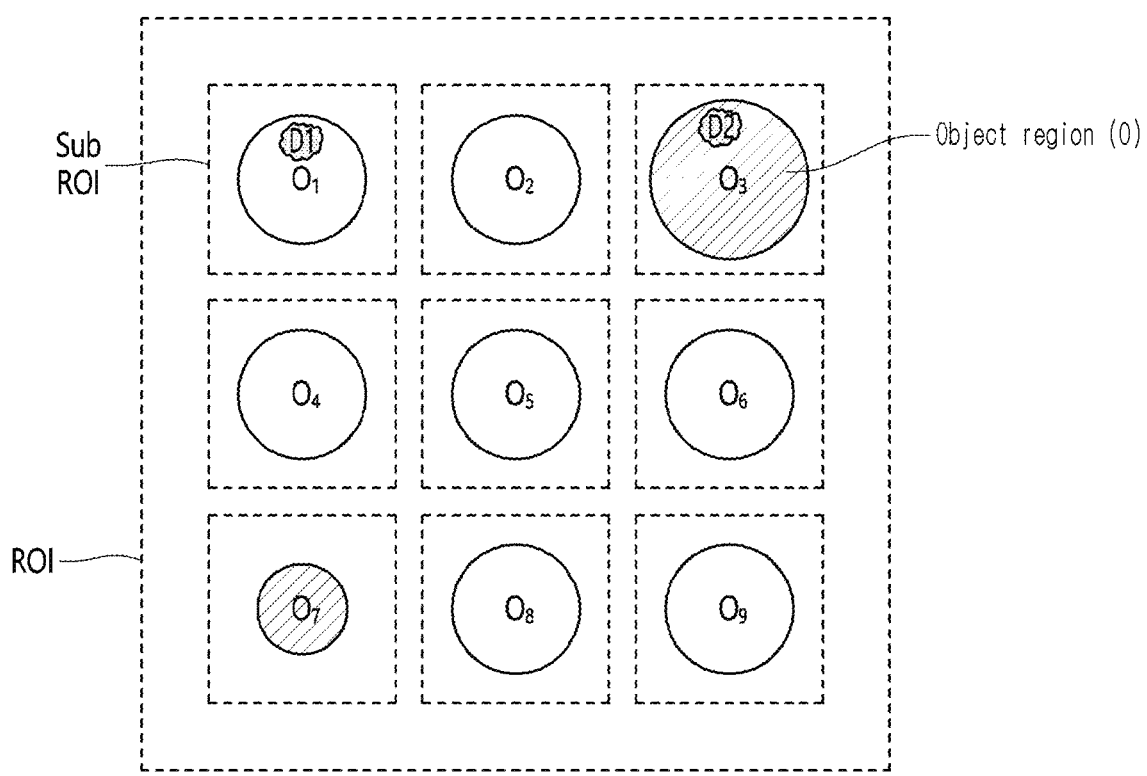
FIG. 9 is a view showing a target image on which a third inspection method has been performed.

Hereinafter, the third inspection method will be further described with reference to FIG. 9. For example, when it is assumed that there is a plurality of solders on a target (circuit board), a plurality of circular regions may exist in the region of interest as shown in FIG. 9, and the non-destructive inspection apparatus 10 may first identify each circular area as an object region, calculate a center value or a center point of each object region, and generate and determine a subregion of interest of a shape set by the inspector before, i.e., [rectangle], on the basis of the calculated center value or center point. In a target image that is actually inspected, each of the solders may not be necessarily formed in the shape of a perfect circle as shown in FIG. 9, and therefore, the generated subregions of interest may not be necessarily formed in the same size, and furthermore, the alignment state of the subregions of interest, i.e., the spaces between the subregions of interest, may not be exactly the same as shown in FIG. 9.

Meanwhile, after a plurality of subregions of interest is determined in the target image, the non-destructive inspection apparatus 10 may identify a defective region in each subregion of interest (S4045).

Figure 8:
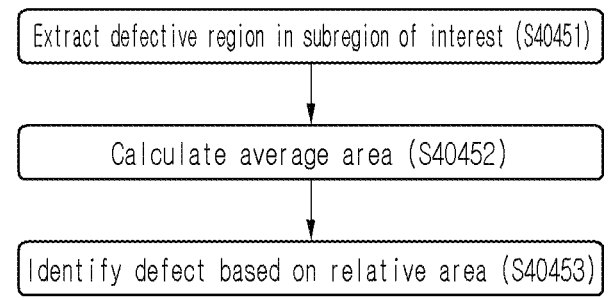
FIG. 8 is a flowchart illustrating the process of subdividing the defect identification step in the third inspection method.

The method of identifying defects in the third inspection method is partially different from those of the first and second inspection methods described above, and specifically, defects are identified based a relative area between the object regions in the subregions of interest or defective regions in the object regions. FIG. 8 shows subdivided steps of step S406, and according thereto, the step of identifying a defect in each subregion of interest may include the steps of extracting defective regions in the subregion(s) of interest (S40451), calculating at least one among the average area of the object regions or the average area of the defective regions (S40452), and identifying a subregion of interest having an object region, of which the ratio of the area of the object region or the defective region to the average area exceeds a preset range, as a defective region (S40453).

First, at the step of extracting defective regions from the object region in the subregion(s) of interest (S40451), the defective region may be defined as a region configured of sets of pixels having similar values even in the object regions, and preferably, it may be defined as a region having an arbitrary area inside a closed curve. In FIG. 9, the object regions in the subregion(s) of interest are indicated by a symbol of $O_n$, and the defective regions are indicated by a symbol of $d_n$ in some object regions.

Next, step S40452 is a step of calculating at least one among the average area of the extracted object regions and the average area of the defective regions in the object regions, and the calculated average area is a value, i.e., a reference value, used for determining whether a plurality of object regions has a defect of insufficient solder/excessive solder in the future. Meanwhile, although it is general that the reference value can be obtained by adding the areas of all object regions or defective regions and dividing the added area by the number of object regions or the number of defective regions in calculating such the reference value, since there may be a very significant defect in the object regions or the defective regions and some of the object regions or the defective regions may have a very large area value, a very small area value, or no area value at all, at this step, the areas of the object regions or the defective regions are obtained and sorted in a descending or ascending order, and then object regions of an area having the greatest difference from an arbitrary value, e.g., the median value (a value existing at the center of listed object region values), are excluded from calculation of the average area. For example, referring to FIG. 9, a total of 9 object regions O1 to O9 exist in the target image, and object region O3 having the largest area and object region O7 having the smallest area among them may be excluded when the average area is calculated. In this way, when calculating the average area, object regions having the greatest difference from the median value are excluded to increase the reliability of the average area, i.e., the reference value, which will be a reference when defects are identified in the future. For reference, object regions excluded when the average area is calculated are referred to as exclusion candidates for convenience. Meanwhile, although an embodiment of comparing the area of each object region based on the [median value] is mentioned in the above embodiment, it is understood that this is not necessarily limited thereto. That is, the non-destructive inspection apparatus 10 may determine object regions or defective regions to be excluded when the average area is calculated according to the inspection template set by the inspector or direct input of the inspector. For example, it may be implemented to calculate the average area while excluding area values of object regions or defective regions included in the top 3% in descending order, and area values of object regions or defective regions included in the top 2% in ascending order, or implemented to use only the regions having a distribution value of a certain level (number) or more for calculation of the average area considering area distribution of each region, or implemented to calculate the average area while excluding a fixed number of regions in ascending and descending order.

Meanwhile, after the average area of the object regions or the defective regions is calculated at step S40452, the non-destructive inspection apparatus 10 compares the average area of the object regions or the average area of the defective regions with the area of each object region or defect area, and identifies that a defect exists in the object regions when the difference exceeds a preset range (S40453). At this point, it is natural that at step S40453, the object regions excluded when the average area is calculated will be identified as having a defect, and in addition, object regions having a large difference from the average area are identified as having a defect.

Seeing one embodiment with reference to FIG. 9, when calculating the average area of the object regions, the non-destructive inspection apparatus 10 may calculate the average area of the area values of O1, O2, O4 to O6, O8, and O9, excluding the area values of O3 (the object region having the largest area) and O7 (the object region having the smallest area), and determine, after the average area is calculated, an insufficient solder defect/excessive solder defect by comparing the average area with the area value of each of the object regions O1 to O9. On the other hand, when the average area is calculated, the defective regions D1 and D2 may be further considered, and when the defect is determined, the proportion of the defective region in each object region may also be determined. That is, although a certain object region may be determined as falling within the normal range in comparison with the average area, at the same time, the object region may also be determined as having a defect since the proportion of the defective region existing in the object region exceeds a preset value (e.g., 60%).

A non-destructive inspection method based on a transmission image according to the present invention has been described above with reference to the drawings. Hereinafter, particularly a first user interface of the method of providing a non-destructive inspection function according to the present invention will be described in detail with reference to FIGS. 10 to 14. For reference, the first user interface includes a menu for newly creating the inspection template of step S102 shown in FIG. 2.

The method of providing a non-destructive inspection function according to the present invention assumes that the first user interface is displayed on the non-destructive inspection apparatus basically having a display, and includes the steps of displaying the first user interface including a plurality of icons when an inspection template creation menu is selected by a user who desires to create an inspection template, receiving a user input while the first user interface is displayed, and creating and setting the inspection template according to the received user input.

Figure 10:
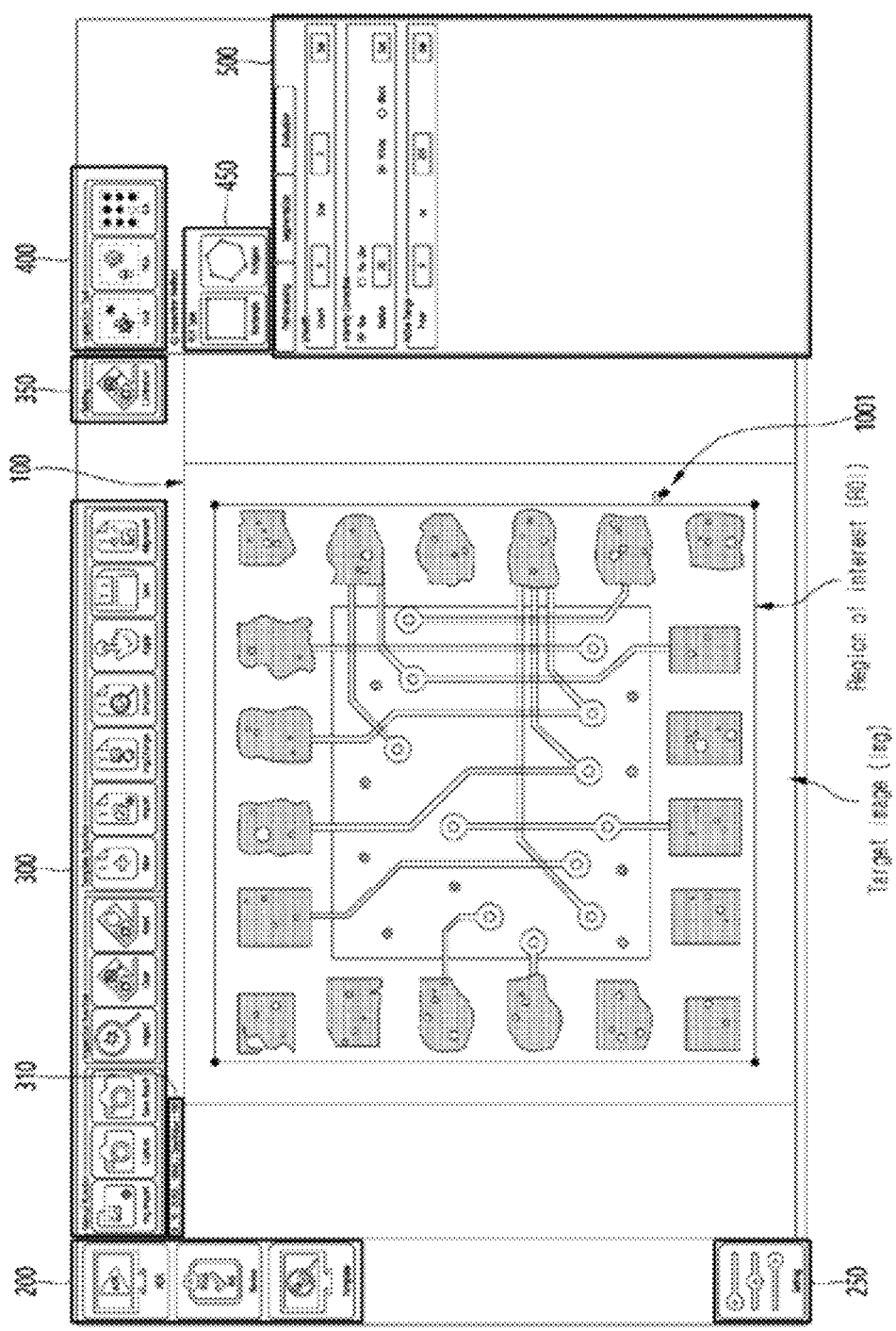
FIG. 10 is a view showing the process of displaying a first user interface.

FIG. 10 is a view showing the first user interface including a main area 100 displaying images and markers needed for editing an inspection template, and a plurality of icons needed for a user to create the inspection template. For reference, it is understood that the arrangement positions of the icons described below, the shapes of the icons shown in the drawings, and the like are all described and illustrated as an embodiment to help understanding of the present invention, and these arrangements and shapes may be diversely changed.

Referring to FIG. 10, first, icons for changing the type of the user interface may be displayed on the leftmost side of the first user interface. That is, icons corresponding to the automatic inspection execution mode (ADR), the inspection review mode (Review), and the inspection template editing mode (Template) may be displayed in the area of reference numeral 200, and each of the icons may be displayed on the screen in the form of a different user interface when there is a selection input from a user. FIG. 10 is a view showing a state of clicking the inspection template editing icon and displaying a first user interface corresponding to the icon. Meanwhile, since the background of a color different from the color of the other icons that have not been selected is displayed around the icon selected by the user, the user may recognize which icon is selected.

In addition, a setting icon (Setting) may be arranged at the bottom left of the first user interface, and when the setting icon is clicked by the user, a menu for language setting and inspection tool setting may be displayed. At this point, the menu for setting the inspection tool may include menu items for changing the color of a line dragged when a region of interest is specified, thickness of the line, and transparency of the dragged line or the area set by the drag.

Meanwhile, icons of functions required for the user to create and edit the inspection template may be displayed in the first user interface in group, and for example, a template tool group including icons for newly creating and saving inspection templates as shown in reference numerals 300 and 350, and an inspection tool group in which functions that can perform various settings for an arbitrary inspection template are iconized and displayed in group as shown in reference numerals 400 and 450 may be displayed. In addition, the first user interface may further include an area (parameter input area) in which parameters can be set as shown in reference numeral 500. Hereinafter, each of the icons included in the template tool group and the inspection tool group will be described.

Seeing the template tool group first, the tool group may include a target image import icon (Img. Import) for importing a target image, a capture icon (Capture) for capturing a result image of non-destructive inspection and saving the result image in an arbitrary image format, a result save icon (Save Result) for saving results of non-destructive inspection in the form of a file (preferably XML) that can be read in a review mode, a new icon (New) for creating and editing a new inspection template, an import icon (Import) for importing a previously stored inspection template or components of the inspection template (the components are preferably created as an XML file), an image change icon (Img. Change) for changing a reference image of the inspection template, a simulator icon (Simulator) for confirming whether automatic inspection is possible by simply executing an automatic inspection mode on the basis of the currently edited inspection template, a save icon (Save) for saving the edited inspection template, an alignment icon (Alignment) for determining whether or not to automatically align target images when non-destructive inspection is performed, an inspection icon (Inspect) for performing non-destructive inspection on a target image in the current setting state during editing, a clear icon (Clear) for initializing only the inspection result while maintaining settings of the currently edited inspection tool, a reset icon (Reset) for initializing both inspection tool settings and inspection results, and a calibration icon (Calibration) capable of arbitrarily changing the pixel unit of an image (preferably to an actual SI unit). Meanwhile, in relation to the simulator icon, when the simulator icon is selected (clicked) by the user, a guide window may be displayed on the non-destructive inspection apparatus so that the user may specify a target folder, and when an arbitrary target folder is selected, all the images in the selected folder may be inspected based on the settings of the currently edited inspection template. At this point, the inspection result may not be saved. In addition, in relation to the alignment icon, when the alignment icon is selected (clicked) by the user, the non-destructive inspection apparatus may display an item inquiring the user whether or not to use automatic alignment, an item inquiring whether the alignment is applied to the entire target image or limited to a region defined by the user, and other items needed for alignment (e.g., a value obtained by calculating, after the alignment, a total sum of the difference in the density of each pixel between a target image that is the reference of the inspection template and a target image that is a target image in order to proceed inspection when the value is smaller than a reference value and determine an alignment error when the value exceeds the reference value) to the user through a separate guide window.

On the other hand, the first user interface may further display pointer information 310 that expresses a position value of a pointer (preferably a mouse pointer) as an (x, y) coordinate value and displays a pixel brightness value of a point where the pointer is located. Since the pointer information 310 may be provided to the user in real-time on the user interface according to the present invention whenever the position of the pointer changes, although there is a region that is difficult to identify with naked eyes due to a fine difference in the brightness value of the target image (e.g., when arbitrary parts are overlapped in a transmission image, the color displayed in the image may be changed due to the overlap, and when the overlapped parts are very thin, a fine color difference may occur), the user may input various parameters of the inspection template or specify regions of interest while confirming the pointer information 310.

Referring to FIG. 10 again, test tool groups 400 and 450 and a parameter input area 500 may be displayed on the right side of the screen.

Reference numeral 400 denotes icons presented for the user to select an inspection method, and here, icons for selecting a first inspection method (Void; when a region of interest is specified, whether a defect is in the region of interest is inspected), a second inspection method (NGA; when target images to be inspected are tomography images of an arbitrary target, an object of an irregular shape in the region of interest is detected, and defects therein are inspected), and a third inspection method (GA; objects having a fixed pattern are recognized, and defects are inspected through comparison within or between the objects) may be included.

Figure 11:
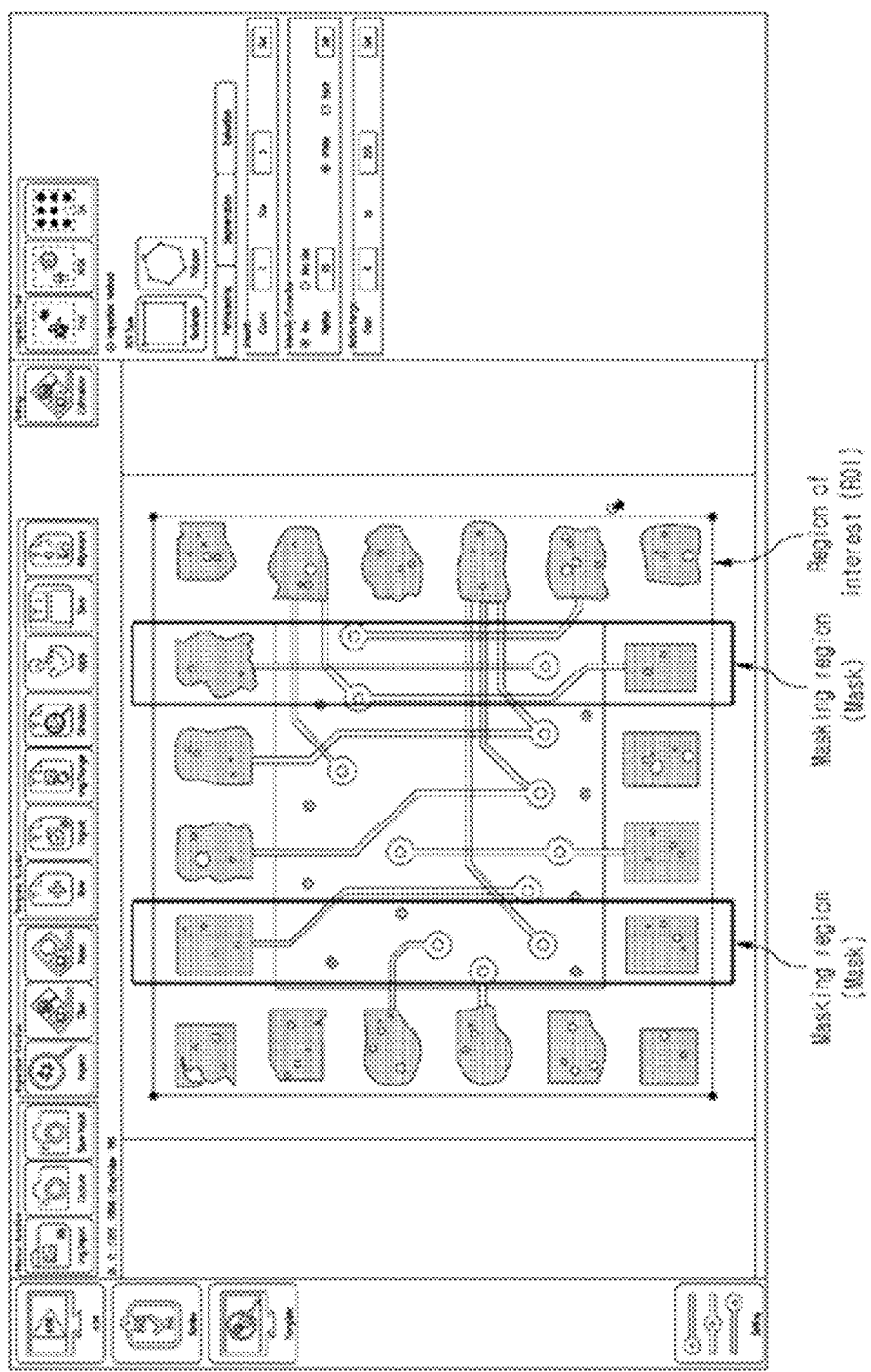
FIG. 11 is a view showing the process of setting a masking region on a first user interface.

Meanwhile, when any one among the first to third inspection methods is selected, a menu (Inspection Method) for selecting a detailed inspection method may be further displayed. For example, when it is assumed that the first inspection method is selected, a menu for selecting any one among a basic inspection method (Original Inspection Method; a method of recognizing a region of interest specified by the user as an object and finding defects in the region of interest or the object), a masking region specifying method (Masking Region for Inspection; a method of independently specifying a separate masking region in the region of interest, setting separate preprocessing parameters and segmentation parameters for the masking region, and finding defects in the region of interest considering the masking region), and a masking region exclusion method (Masking Region for Exclusion; a method of specifying a masking region for excluding inspection in the region of interest, and finding defects only in the region of interest other than the excluded region) may be displayed under the icons of reference numeral 400. For reference, FIG. 11 is a view showing an embodiment of further specifying a masking region on the target image displayed in the main area of FIG. 10. As it is described above briefly, the masking region specified on the interface according to the present invention may be defined in two types, and one of them may be defined as a region for identifying an area in which configurations such as circuits or the like are overlapped in the target image, and individually setting parameters for identifying defects in the overlapped area, and the other one may be defined to exclude defect inspection. Referring to FIG. 11, as the masking region may be specified by the user through dragging input of a region including four arbitrary points, or by allowing the user to select a plurality of arbitrary points in a way similar to specifying a region of interest (ROI), an inner polygonal shape defined by the corresponding points may also be specified as the masking region.

Meanwhile, icons 450 for determining whether to specify a region of interest as a rectangle or a polygon in specifying the region of interest may be further provided under the icon 400 for selecting an inspection method. A view of specifying a region of interest (ROI) inside a target image (Img) is shown in the main area 100 of FIG. 10, and the region of interest (ROI) is a region specified by the user himself or herself by clicking the rectangle icon.

Figure 12:
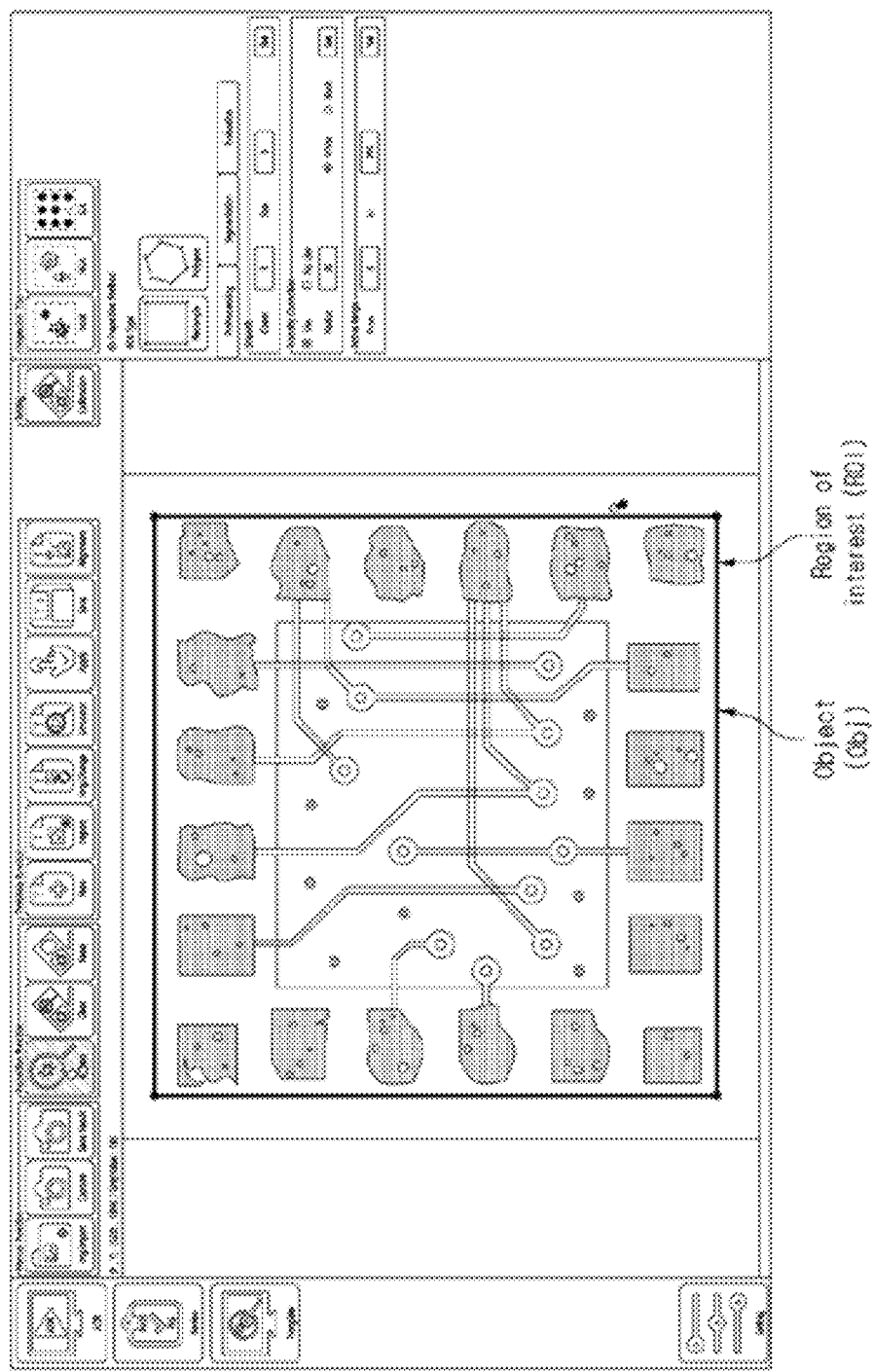
FIG. 12 is a view showing a first user interface appeared when an inspection execution icon is clicked to execute non-destructive inspection.

FIG. 12 is a view showing that an inspection has been performed on a target image in the main area when the inspection icon (Inspect) mentioned in FIG. 10 is clicked. After clicking the inspection icon (Inspect), as the line color of the rectangle that specifies the region of interest (ROI) is changed first in the target image compared with FIG. 10, it may display the user that the inspection has been performed, and in addition, as the outlines for identifying the corresponding object regions are displayed in the object regions identified by the inspection, the user may see which region is identified as an object region. For reference, as it is described above briefly, a target image, i.e., the target of inspection when the inspection icon (Inspect) is clicked, is a reference image displayed on the main area when the inspection template is created and edited currently, and the inspection performed by clicking the inspection icon (Inspect) may be preferably performed on a one-time basis targeting the reference image. That is, the inspection icon (Inspect) on the first user interface may be used to confirm whether the non-destructive inspection is properly performed based on the region of interest specified by the user himself or herself on the reference image or the parameters set by the user himself or herself.

Figure 13:
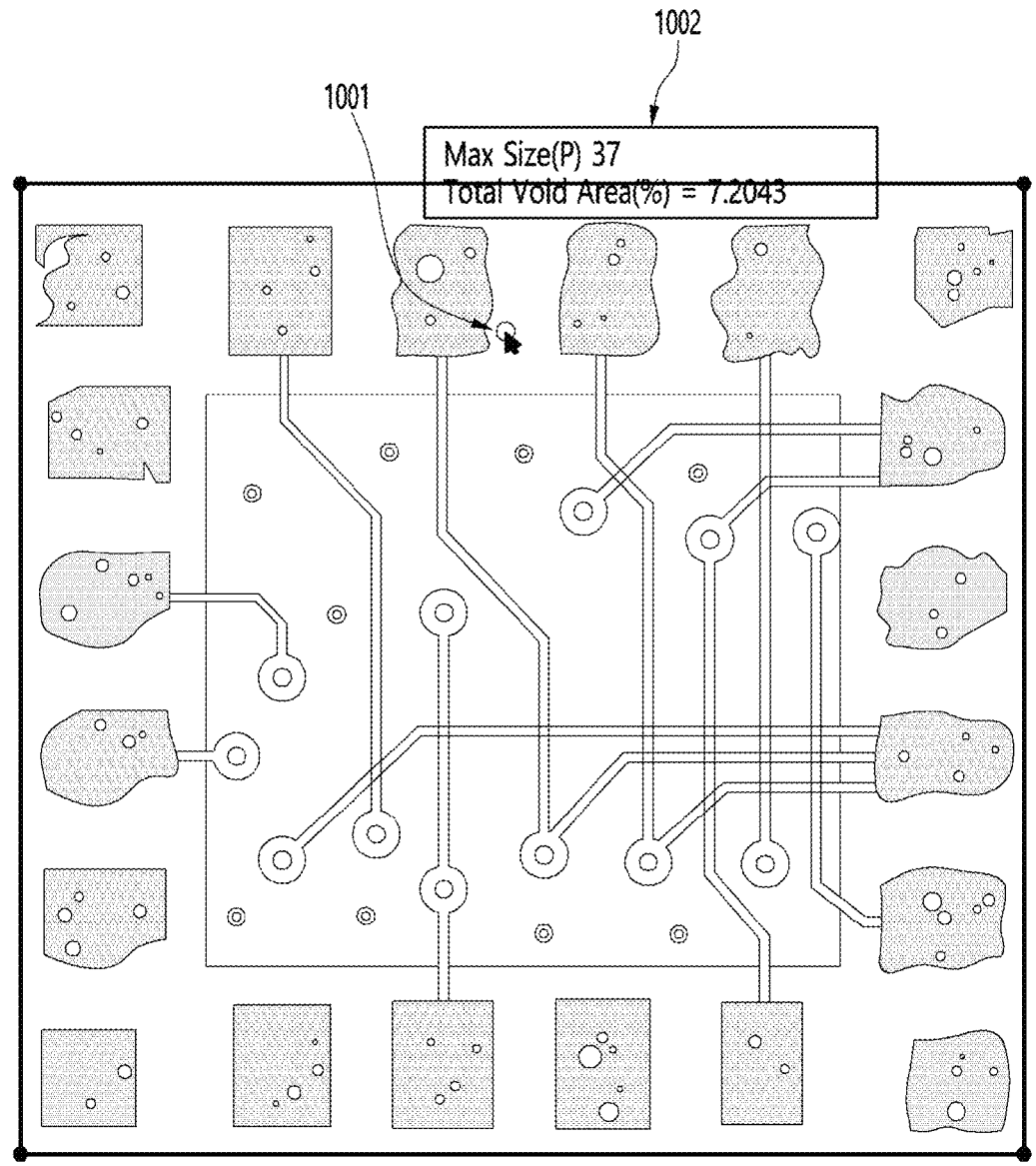
FIGS. 13 and 14 are views showing a first user interface displayed when a user moves and places a pointer at an arbitrary point on a target image.

FIG. 13 is a view showing region information 1002 displayed when the user places the pointer 1001 on the object region in the main area in FIG. 12, and in the first user interface of the present invention, when the user places the pointer 1001 on a region that the user desires to see, information on the region, such as information on the size of the region (preferably, size information expressed in terms of a pixel size or the number of pixels), and the number of defects identified in a corresponding object region or the ratio of a defective region (the ratio of the region occupied by the defect in the object region) and the like, may be displayed as shown in FIG. 13. In addition, depending on a region where the pointer 1001 is placed, the region including the position may be marked by an outline of a different color to distinguish the region. A view of an object region surrounded by a blue line along the outline is shown in FIG. 13.

Figure 14:
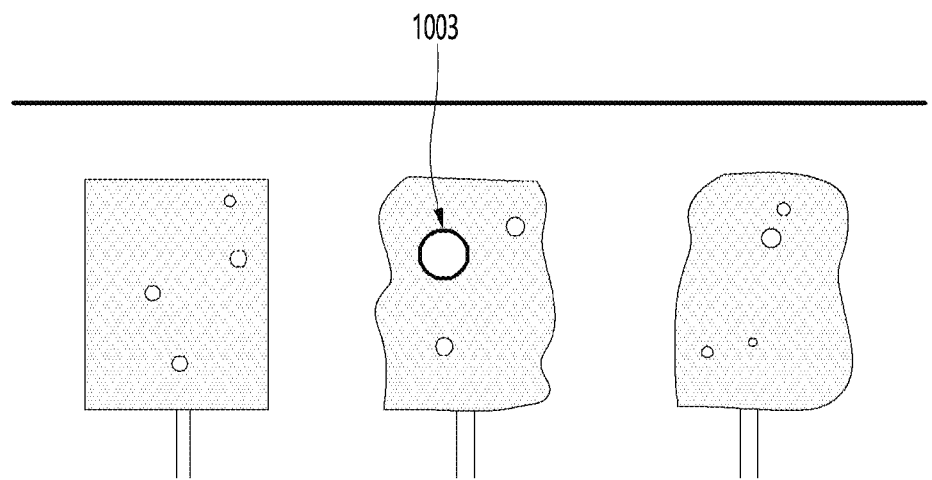

Meanwhile, FIG. 14 is a view showing an outline 1003 of a different color displayed to distinguish a corresponding defective region when the pointer 100 is placed on a defect in an object region.

As described above, information on the corresponding region may be provided on the first user interface according to a point on the main region to which the user places the pointer 1001 after the inspection is performed, and in addition, an outline may be separately displayed to distinguish the corresponding area.

Meanwhile, when any one among the first to third inspection methods is selected, the user may input various parameter values in the parameter input area (reference numeral 500 in FIG. 10), and at this point, the detailed description of each inspection method described above will be referred to for the parameters that can be input.

Figure 15:
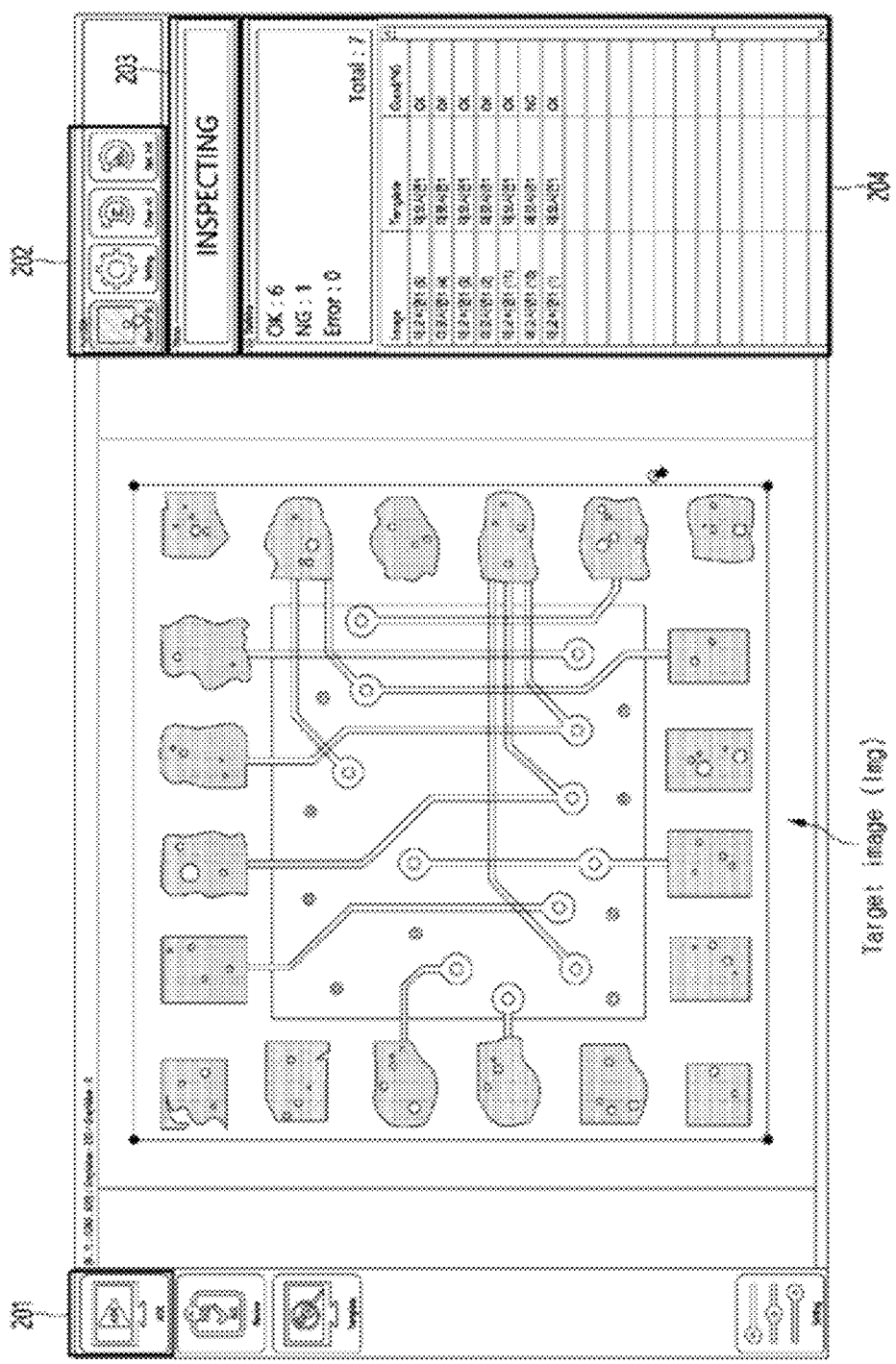
FIG. 15 is a view showing the process of displaying a second user interface.

FIG. 15 is a view showing the process of displaying a second user interface according to the present invention. The second user interface is displayed when the user clicks the automatic inspection menu, i.e., the icon on the left side of the screen in FIG. 15 (ADR icon in reference numeral 200), and a plurality of icons 202 needed for automatic inspection execution, a current inspection progress state 203, and a result 204 may be displayed in the interface.

An icon (Start of Stop) for executing or stopping automatic inspection, an icon (Setting) for setting a macro for automatic inspection, an icon (Clear All) for initializing an inspection list, and an icon (Reset Stat) for initializing inspection statistics may be included in the plurality of icons 202 needed for performing automatic inspection.

In addition, a script of "Inspecting" may be displayed in the area indicating the current inspection progress state 203 to indicate that the automatic inspection mode is currently activated, and contrarily, a script of "Stop" may be displayed to indicate that the automatic inspection mode is deactivated.

Meanwhile, the number of normal inspection results (OK), the number of defective inspection results (NG), the number of errors including alignment error or the like may be displayed in the area displaying the results 204, and a list of images on which the inspection is performed in the automatic inspection mode may be displayed under the area displaying the results.

A non-destructive inspection method based on a transmission image, a method of providing a non-destructive inspection function, and an apparatus for the same have been described above. Meanwhile, the present invention is not limited to the specific embodiments and application examples described above, and it is apparent that various modifications are possible by those skilled in the art without departing from the gist of the present invention claimed in the claims, and furthermore, these modifications should not be understood as being distinguished from the technical spirit or perspective of the present invention.

The invention claimed is:

1. A non-destructive inspection method based on a transmission image, performed by a non-destructive inspection apparatus comprising a central processing unit and a memory, the method comprising the steps of:
   setting an inspection template;
   loading a target image; and
   performing non-destructive inspection by applying the inspection template to the target image,
   wherein,
   the step of setting an inspection template includes the steps of:
   specifying region of interest; and
   setting a threshold value that can be a reference value when identifying an object region or a defective region in the region of interest specified by the inspector, and
   the step of performing non-destructive inspection by applying the inspection template to the target image includes the step of:
   identifying a defect in at least one region of interest automatically specified on the target image by the inspection template.

2. The method according to claim 1, wherein the step of performing non-destructive inspection by applying the inspection template to the target image includes the steps of:

performing image preprocessing on the target image; and identifying a defect in at least one region of interest (ROI) specified on the target image by the inspection template.

3. The method according to claim 1, wherein the step of performing non-destructive inspection by applying the inspection template to the target image includes the steps of:

performing image preprocessing on the target image;

extracting one or more object regions from the region of interest; and identifying a defect in the object region.

4. The method according to claim 1, wherein the step of performing non-destructive inspection by applying the inspection template to the target image includes the steps of:

performing image preprocessing on the target image;

defining a plurality of subregions of interest in the region of interest;

defining a shape of a subregion of interest based on a shape of the set subregions of interest;

determining the subregions of interest in the region of interest by referring to the defined shape of a subregion of interest; and identifying a defect in the determined subregions of interest.

5. A non-transitory computer-readable storage medium storing commands for a non-destructive inspection apparatus comprising a central processing unit and a memory to perform a non-destructive inspection method based on a transmission image, the method comprising the steps of:

setting an inspection template;

loading a target image; and performing non-destructive inspection by applying the inspection template to the target image, wherein, the step of setting an inspection template includes the steps of:

specifying region of interest; and setting a threshold value that can be a reference value when identifying an object region or a defective region in the region of interest specified by the inspector, the step of performing non-destructive inspection by applying the inspection template to the target image includes the step of:

identifying a defect in at least one region of interest automatically specified on the target image by the inspection template.

* * * * *